United States Patent
Liu et al.

(10) Patent No.: US 10,636,124 B2
(45) Date of Patent: Apr. 28, 2020

(54) IMAGE ENHANCEMENT METHOD UTILIZING PIXELS OF AN INPUT IMAGE IN A YUV COLOR SPACE

(71) Applicant: REALTEK SEMICONDUCTOR CORP., Hsinchu (TW)

(72) Inventors: Kai Liu, Taipei (TW); Wen-Tsung Huang, Chiayi (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 107 days.

(21) Appl. No.: 16/121,841

(22) Filed: Sep. 5, 2018

(65) Prior Publication Data
US 2019/0156464 A1    May 23, 2019

(30) Foreign Application Priority Data
Nov. 22, 2017    (TW) .............................. 106140557 A

(51) Int. Cl.
*G06T 5/00* (2006.01)
*G06T 7/13* (2017.01)
*G06K 9/62* (2006.01)
*G06T 7/00* (2017.01)
*H04N 1/409* (2006.01)

(52) U.S. Cl.
CPC ............ *G06T 5/002* (2013.01); *G06K 9/6215* (2013.01); *G06T 5/003* (2013.01); *G06T 7/0002* (2013.01); *G06T 7/13* (2017.01); *H04N 1/409* (2013.01); *G06T 2207/10024* (2013.01); *G06T 2207/20192* (2013.01)

(58) Field of Classification Search
CPC ........... G06T 5/002; G06T 7/13; G06T 5/003; G06T 7/0002; G06T 2207/10024; G06T 2207/20192; G06K 9/6215; H04N 1/409
See application file for complete search history.

(56) References Cited

U.S. PATENT DOCUMENTS

| | | | |
|---|---|---|---|
| 6,668,097 B1* | 12/2003 | Hu | G06T 5/001 375/E7.19 |
| 2010/0260432 A1* | 10/2010 | Shimizu | G06T 5/002 382/255 |
| 2016/0048952 A1* | 2/2016 | Tezaur | G06T 5/004 382/255 |
| 2016/0292837 A1* | 10/2016 | Lakemond | G06T 5/20 |
| 2017/0372675 A1* | 12/2017 | Cho | G09G 5/006 |

FOREIGN PATENT DOCUMENTS

| | | |
|---|---|---|
| TW | I268097 | 12/2006 |
| TW | I281641 | 5/2007 |
| TW | 200729082 | 8/2007 |

(Continued)

*Primary Examiner* — Pakee Fang
(74) *Attorney, Agent, or Firm* — Li & Cai Intellectual Property (USA) Office

(57) ABSTRACT

Disclosed are an image enhancement method and an image enhancement apparatus which can realize the edge enhancement for an image generated after a demosaicing process according to local characteristics of an input image (i.e. the image sharpening) and can realize the brightness noise suppression and the chroma noise suppression for the image. Thus, by using the image enhancement method and the image enhancement apparatus provided by the present disclosure, clear images can be generated.

20 Claims, 14 Drawing Sheets

(56) References Cited

FOREIGN PATENT DOCUMENTS

| TW | I285507 | 8/2007 |
|----|---------|--------|
| TW | I303942 | 12/2008 |
| TW | I314301 | 9/2009 |
| TW | I317231 | 11/2009 |
| TW | I318533 | 12/2009 |
| TW | I330036 | 9/2010 |
| TW | 201134195 | 10/2011 |
| TW | I351225 | 10/2011 |
| TW | I352538 | 11/2011 |
| TW | I353166 | 11/2011 |
| TW | I372365 | 9/2012 |
| TW | I374662 | 10/2012 |
| TW | I382755 | 1/2013 |
| TW | I387319 | 2/2013 |
| TW | I388219 | 3/2013 |
| TW | I392361 | 4/2013 |
| TW | I417810 | 12/2013 |
| TW | I493503 | 7/2015 |

\* cited by examiner

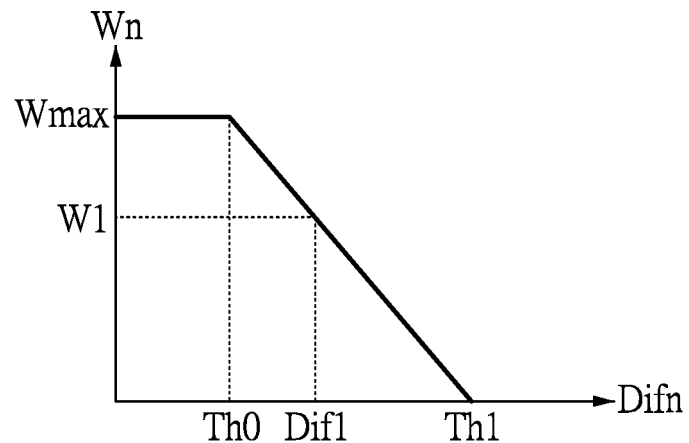
FIG. 4B
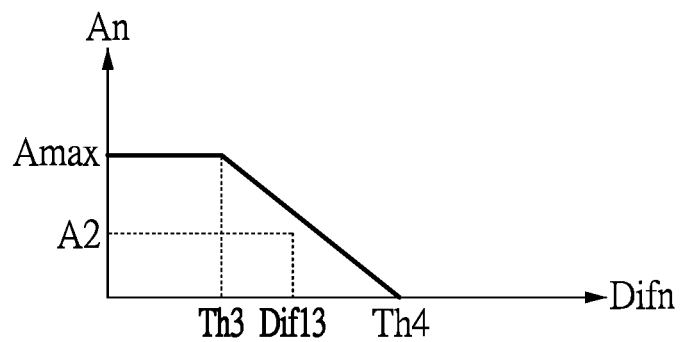
FIG. 4C
| W0 | W1 | W2 | W3 | W4 |
|---|---|---|---|---|
| W5 | W6 | W7 | W8 | W9 |
| A0 | A1 | × | A2 | A3 |
| W10 | W11 | W12 | W13 | W14 |
| W15 | W16 | W17 | W18 | W19 |
FIG. 4D

| Y6 | Y7 | Y8 |
|---|---|---|
| Y11 | Y12 | Y13 |
| Y16 | Y17 | Y18 |

MS1

| -2 | -3 | -3 | -3 | -2 |
|---|---|---|---|---|
| -3 | -1 | 4 | -1 | -3 |
| -3 | 4 | 24 | 4 | -3 |
| -3 | -1 | 4 | -1 | -3 |
| -2 | -3 | -3 | -3 | -2 |

MS2

| 0 | 0 | 0 | 0 | 0 |
|---|---|---|---|---|
| -3 | 1 | 4 | 1 | -3 |
| -3 | 1 | 4 | 1 | -3 |
| -3 | 1 | 4 | 1 | -3 |
| 0 | 0 | 0 | 0 | 0 |

ImU

| U0 | U1 | U2 | U3 | U4 |
|---|---|---|---|---|
| U5 | U6 | U7 | U8 | U9 |
| U10 | U11 | U12 | U13 | U14 |
| U15 | U16 | U17 | U18 | U19 |
| U20 | U21 | U22 | U23 | U24 |

FIG. 11A

ImY

| Ymean 1 | | | Ymean 2 | |
|---|---|---|---|---|
| Y0 | Y1 | Y2 | Y3 | Y4 |
| Y5 | Y6 | Y7 | Y8 | Y9 |
| Y10 | Y11 | Y12 | Y13 | Y14 |
| Y15 | Y16 | Y17 | Y18 | Y19 |
| Y20 | Y21 | Y22 | Y23 | Y24 |

FIG. 11B

IMAGE ENHANCEMENT METHOD UTILIZING PIXELS OF AN INPUT IMAGE IN A YUV COLOR SPACE

CROSS-REFERENCE TO RELATED PATENT APPLICATION

This application claims the benefit of priority to Taiwan Patent Application No. 106140557, filed on Nov. 22, 2017. The entire content of the above identified application is incorporated herein by reference.

BACKGROUND OF THE INVENTION

1. Field of the Invention

The present disclosure relates to an image enhancement method and an image enhancement apparatus; in particular, to an image enhancement method and an image enhancement apparatus that can realize edge enhancement and noise suppression of an input image.

2. Description of Related Art

Generally, after demosaicing, raw color filter array (CFA) images can be converted to a full-color image. However, since this full-color image has not undergone sharpening, it is different from what is perceived by human eyes. After demosaicing, the edge enhancement will be performed on the full-color image, thereby obtaining sharper images that are closer to what is perceived by human eyes.

However, since noises of the images are often amplified due to the edge enhancement, a solution is needed to achieve a balance between edge enhancement and noise suppression.

SUMMARY OF THE INVENTION

An image enhancement method and an image enhancement apparatus are provided by the present disclosure, which can realize edge enhancement for an image generated after a demosaicing process according to local characteristics of an input image (i.e. the image sharpening), and brightness noise suppression and chroma noise suppression for the image. Thus, the image enhancement method and the image enhancement apparatus provided by the present disclosure help to generate clear images.

The image enhancement method provided by the present disclosure is adapted to an image enhancement apparatus. The image enhancement method includes the following steps: (A) sequentially obtaining pixels of an input image in a YUV color space, wherein each pixel includes a Y pixel, a U pixel and a V pixel; (B) executing a low-pass filtering process with respect to a target Y pixel and a plurality of adjacent pixels of the target Y pixel to generate a first low-pass pixel; (C) determining whether the target Y pixel is an edge pixel according to a total gradient variation, wherein when the target Y pixel is the edge pixel, the low-pass filtering process is executed according to an orientation of the edge pixel with respect to the target Y pixel and the adjacent pixels corresponding to the orientation to generate a second low-pass pixel; (D) determining whether the target Y pixel is a thin edge pixel, wherein when the target Y pixel is not a thin edge pixel, an edge response between the target Y pixel and the adjacent pixels is calculated according to a first mask, but when the target Y pixel is a thin edge pixel, the edge response between the target Y pixel and the adjacent pixels is calculated according to a second mask, and the edge response calculated according to the second mask is larger than the edge response calculated according to the first mask; (E) calculating an enhanced pixel corresponding to the total gradient variation and the edge response according to an enhancement function; and (F) adding the enhanced pixel to the second low-pass pixel to generate an output Y pixel.

In one embodiment of the image enhancement method provided by the present disclosure, the step of sequentially obtaining the pixels of the input image in the YUV color space includes the following steps: (A1) executing a noise suppression process with respect to a target U pixel and a plurality of adjacent pixels of the target U pixel to generate a noise suppressed U pixel; (B1) determining whether the target U pixel is smaller than or equal to a low-chroma pixel; (C1) decreasing the target U pixel to generate an output U pixel when the target U pixel is smaller than or equal to the low-chroma pixel, and determining whether the target U pixel is smaller than or equal to a high-chroma pixel when the target U pixel is larger than the low-chroma pixel; and (D1) adjusting the target U pixel to generate the output U pixel according to a monotonic increasing function when the target U pixel is smaller than or equal to the high-chroma pixel, but taking the target pixel as the output U pixel when the target U pixel is larger than the high-chroma pixel.

In one embodiment of the image enhancement method provided by the present disclosure, the step of sequentially obtaining the pixels of the input image in the YUV color space includes following steps: (A2) executing a noise suppression process with respect to a target V pixel and a plurality of adjacent pixels of the target V pixel to generate a noise suppressed V pixel; (B2) determining whether the target V pixel is smaller than or equal to a low-chroma pixel; (C2) decreasing the target V pixel to generate an output U pixel when the target U pixel is smaller than or equal to the low-chroma pixel, and determining whether the target V pixel is smaller than or equal to a high-chroma pixel when the target V pixel is larger than the low-chroma pixel; and (D2) adjusting the target V pixel to generate the output V pixel according to a monotonic increasing function when the target V pixel is smaller than or equal to the high-chroma pixel, but taking the target pixel as the output V pixel when the target V pixel is larger than the high-chroma pixel.

The image enhancement apparatus provided by the present disclosure includes an image capturing device and an image processor. The image capturing device sequentially obtains pixels of an input image in a YUV color space. Each pixel includes a Y pixel, a U pixel and a V pixel. The image processor is electrically connected to the image capturing device and is configured to: (A) receive each pixel of the input image in the YUV color space; (B) execute a low-pass filtering process with respect to a target Y pixel and a plurality of adjacent pixels of the target Y pixel to generate a first low-pass pixel; (C) determine whether the target Y pixel is an edge pixel according to a total gradient variation, wherein when the target Y pixel is an edge pixel, the low-pass filtering process is executed according to an orientation of the edge pixel with respect to the target Y pixel and the adjacent pixels corresponding to the orientation to generate a second low-pass pixel; (D) determine whether the target Y pixel is a thin edge pixel, wherein when the target Y pixel is not a thin edge pixel, an edge response between the target Y pixel and the adjacent pixels is calculated according to a first mask, but when the target Y pixel is a thin edge pixel, the edge response between the target Y pixel and the adjacent pixels is calculated according to a second mask, and the edge response calculated according to the second mask is larger than the edge response calculated according to the first mask; (E) calculate an enhanced pixel corresponding to the total gradient variation and the edge response according to an enhancement function; and (F) add the enhanced pixel to the second low-pass pixel to generate an output Y pixel.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which:

FIG. 4B is a relationship diagram showing similarities between a target Y pixel and its adjacent pixels and a first weighting value according to one embodiment of the present disclosure;

FIG. 4C is a relationship diagram showing similarities between the target Y pixel and its adjacent pixels and a second weighting value according to one embodiment of the present disclosure;

FIG. 4D shows a schematic diagram of the first weighting value and the second weighting value of the Y-channel image according to one embodiment of the present disclosure;

FIG. 11A shows a schematic diagram of a depolarized U pixel and the U pixel difference according to one embodiment of the present disclosure;

FIG. 11B shows a schematic diagram of the Y pixel difference according to one embodiment of the present disclosure;

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

The image enhancement method and the image enhancement apparatus provided by the present disclosure are illustrated by the following embodiments. The present disclosure can sharpen edges and suppress brightness noises and chroma noises for an image. Thus, the present disclosure can reduce image distortions that are humanly perceivable. The image enhancement method executed by the image enhancement apparatus primarily includes: edge detection, infinite impulse response (IIR) noises suppression, low-pass filtering of edge orientations, thin edge detection, calculation of the intensity of an edge response and chroma noise suppression for low-chroma pixels. By using the image enhancement method and the image enhancement apparatus provided by the present disclosure, images that are clear and sharp can be provided.

Figure 1:
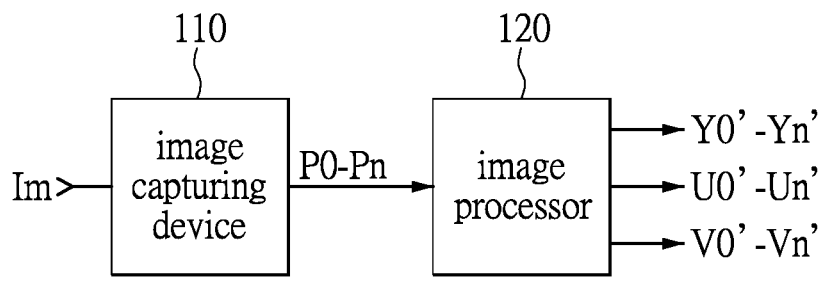
FIG. 1 shows a schematic diagram of an image enhancement apparatus according to one embodiment of the present disclosure.

Referring to FIG. 1, a schematic diagram of an image enhancement apparatus according to one embodiment of the present disclosure is shown. As shown in FIG. 1, an image enhancement apparatus 100 receives an input image Im and obtains pixels of the input image Im in a YUV color space. Each pixel includes a Y pixel, a U pixel and a V pixel, the Y pixel is relevant to the brightness, and the U pixel and the V pixel are relevant to the chroma.

The image enhancement apparatus 100 implements an edge enhancement process for the input image Im and also suppresses the brightness noises and the chroma noises of the input image Im to generate an output Y pixel Y0'-Yn', an output U pixel U0'-Un' and an output V pixel V0'-Vn'. In this embodiment, the image enhancement apparatus 100 can be, for example, a smart phone, a video recorder, a tablet, a laptop or other electronic devices requiring the image enhancement function.

Figures 2A, 2B, 2C:
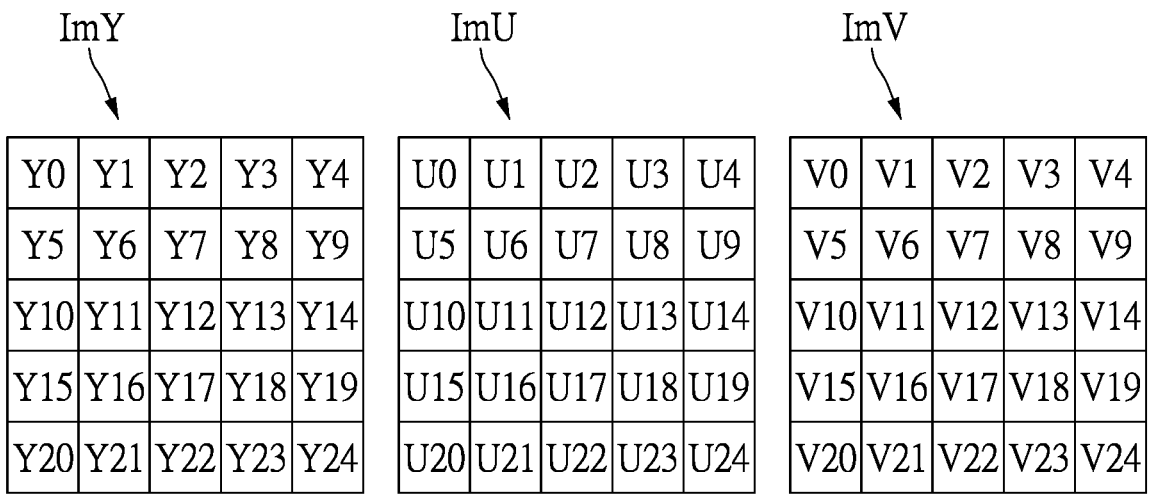
FIG. 2A shows a schematic diagram of a Y-channel image in the YUV color space according to one embodiment of the present disclosure.
FIG. 2B shows a schematic diagram of a U-channel image in the YUV color space according to one embodiment of the present disclosure.
FIG. 2C shows a schematic diagram of a V-channel image in the YUV color space according to one embodiment of the present disclosure.

Referring to FIGS. 2A, 2B and 2C, FIG. 2A shows a schematic diagram of a Y-channel image in the YUV color space according to one embodiment of the present disclosure, FIG. 2B shows a schematic diagram of a U-channel image in the YUV color space according to one embodiment of the present disclosure, and FIG. 2C shows a schematic diagram of a V-channel image in the YUV color space according to one embodiment of the present disclosure. In the YUV color space, the input image Im corresponds to a Y-channel image ImY, a U-channel image ImU and a V-channel image ImV. The Y-channel image ImY includes Y pixels Y0-Y24 of pixels P0-P24, the U-channel image ImU includes U pixels U0-U24 of the pixels P0-P24, and the V-channel image ImV includes V pixels V0-V24 of the pixels P0-P24.

The image enhancement apparatus 100 includes an image capturing device 110 and an image processor 120. As shown in FIG. 1 and FIGS. 2A-2C, the image capturing device 110 sequentially obtains pixels P0-P24 of the input image Im in a YUV color space, and each of the pixels P0-P24 includes a Y pixel, a U pixel and a V pixel. The image capturing device 110 continuously captures images, and the input image Im is one of the images captured by the image capturing device 110. In this embodiment, the input image In includes pixels P0-P24.

The image processor 120 is electrically connected to the image capturing device 110. The image processor 120 is configured to execute the following steps to implement an edge enhancement process for the input image Im and also to suppress the brightness noises and the chroma noises of the input image Im for generating an output Y pixel Y0'-Yn', an output U pixel U0'-Un' and an output V pixel V0'-Vn'.

The pixel P12 and its adjacent pixels P0-P11 and P13-P24 of the input image Im (i.e. a 5×5 mask having the pixel P12 as a center) are used for illustrating this embodiment. Each of the pixels P0-P24 corresponds to a Y pixel, a U pixel and a V pixel. For example, the pixel P12 corresponds to the Y pixel Y12, the U pixel U12 and the V pixel V12. Based on the following steps for adjusting the pixel P12, those skilled in the art can understand how to adjust the other pixels P0-P11 and P13-Pn.

Figure 3:
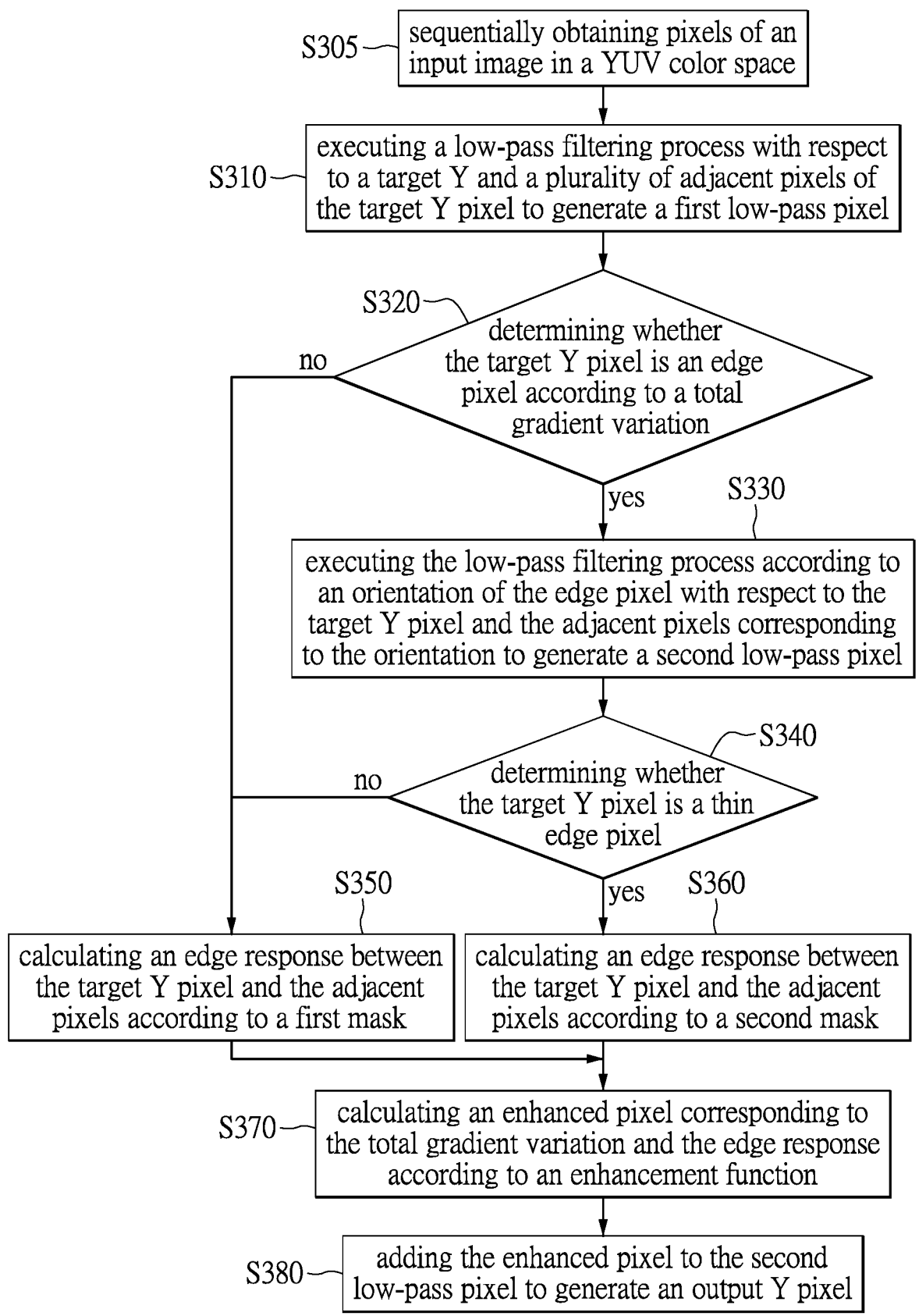
FIG. 3 shows a flow chart of an image enhancement method to enhance Y pixels according to one embodiment of the present disclosure.

Referring to FIG. 3, a flow chart of an image enhancement method to enhance Y pixels according to one embodiment of the present disclosure is shown. The image processor 120 receives an input image Im, and obtains pixels P0-P24 of the input image Im in the YUV color space. Then, the image processor 120 sequentially takes each of Y pixels Yo-Y24 of the pixels P0-P24 as a target Y pixel, and further adjusts each of Y pixels Yo-Y24.

The image processor 120 executes a low-pass filtering process with respect to a target Y pixel Y12 and a plurality of adjacent pixels Y0-Y11 and Y13-Y24 of the target Y pixel Y12 to generate a first low-pass pixel (step S310). In this embodiment, the image processor executes a low-pass filtering process with respect to a target Y pixel Y12 and its adjacent pixels Y0-Y11 and Y13-Y24 to generate a first low-pass pixel Lp1.

Figure 4A:
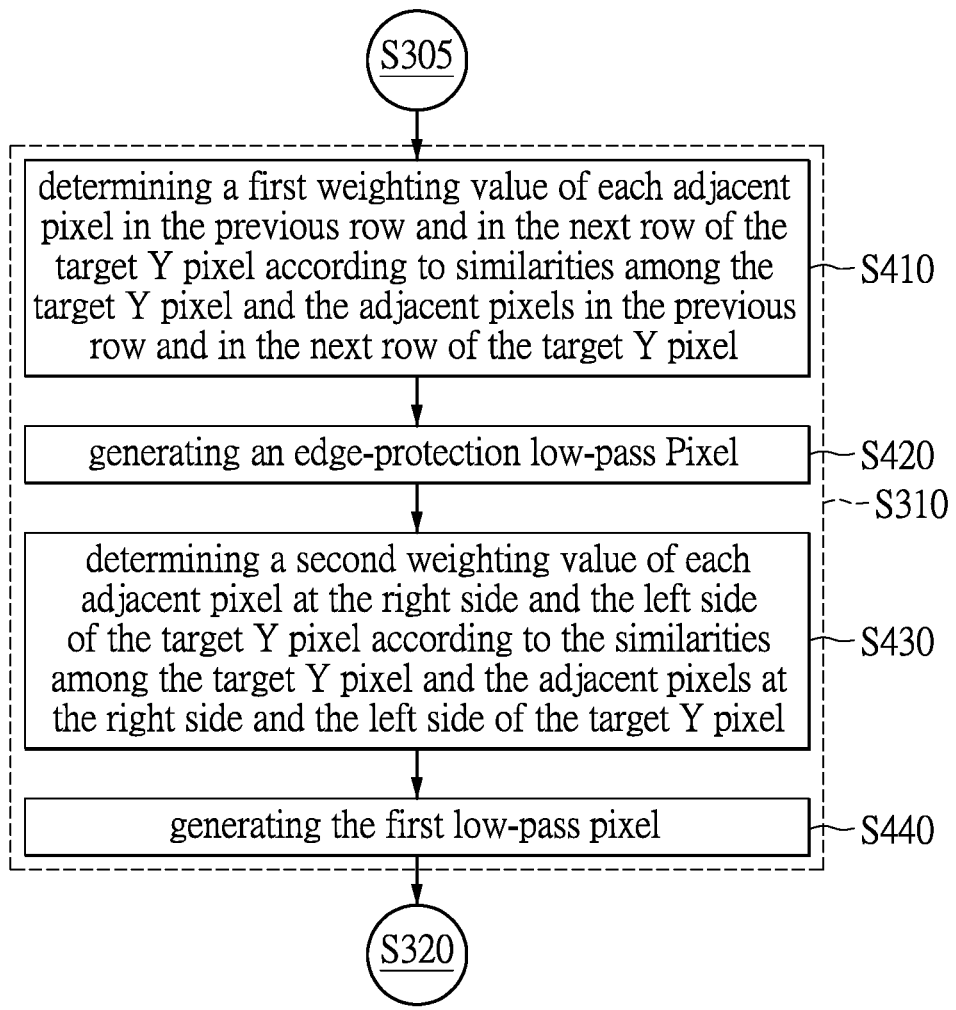
FIG. 4A is a flow chart showing how to generate a first low-pass pixel according to one embodiment of the present disclosure.

Referring to FIG. 4A, a flow chart showing how to generate a first low-pass pixel according to one embodiment of the present disclosure is shown. The image processor 120 determines a first weighting value of each adjacent pixel in previous rows and in subsequent rows of the target Y pixel according to similarities among the target Y pixel and the adjacent pixels in previous rows and in subsequent rows of the target Y pixel (step S410). In this embodiment, the similarity is defined as a difference between the target Y pixel and an adjacent pixel, and each similarity corresponds to a first weighting value.

Referring to FIG. 4B, a relationship diagram showing similarities between the target Y pixel and its adjacent pixels and the first weighting value according to one embodiment of the present disclosure is shown. The maximum first weighting value Wmax, the first threshold value Th0 and the second threshold value Th1 can be defined by a user. Regarding the adjacent pixel Y1 in the previous row of the target Y pixel Y12, a similarity Dif1 between the adjacent pixel Y1 and the target Y pixel Y12 is |Y12-Y1|. As shown in FIG. 4B, according to the similarity Dif1, the image processor 120 can correspondingly find a first weighting value W1.

Thus, according to the similarities between the target Y pixel Y12 and its adjacent pixels Y0-Y9 in previous rows and the similarities between the target Y pixel Y12 and its adjacent pixels Y10-Y19 in subsequent rows, the image processor 120 can determine the first weighting values W0-W9 of the adjacent pixels Y0-Y9 and the first weighting values W10-W19 of the adjacent pixels Y10-Y19. FIG. 4D shows a schematic diagram of the first weighting value and the second weighting value of the Y-channel image according to one embodiment of the present disclosure. As shown in FIG. 4D, adjacent Y pixels of previous rows and subsequent rows can be determined according to the size of the mask or actual needs, and is not limited to that disclosed herein.

The image processor 120 executes a weighted average calculation with respect to the target Y pixel Y12, its adjacent pixels Y0-Y9 in previous rows and its adjacent pixels Y10-Y19 in subsequent rows according to the first weighting values W0-W9 and W10-W19 to generate an edge-protection low-pass pixel EPF (step S420). In this embodiment, the edge-protection low-pass pixel EPF= ((128-(W0+W1+ . . . +W19))*Y12+W0*Y0+W1* Y1+ . . . +W19*Y19)/128. However, the calculation of the edge-protection low-pass pixel EPF can be designed according to actual needs, and is not limited to that disclosed herein.

Afterwards, the image processor 120 determines a second weighting value of each adjacent pixel at the right side and the left side of the target Y pixel according to the similarities among the target Y pixel and the adjacent pixels at the right side and the left side of the target Y pixel (step S430). In this embodiment, the similarity is defined as a difference between the target Y pixel and an adjacent pixel, and each similarity corresponds to a second weighting value.

Referring to FIG. 4C, a relationship diagram showing similarities between the target Y pixel and its adjacent pixels and the second weighting value according to one embodiment of the present disclosure is shown. The maximum second weighting value Amax, the third threshold value Th3 and the fourth threshold value Th4 are defined by the user. Regarding the adjacent pixel Y13 at the right side of the target Y pixel, the similarity Dif13 between the adjacent pixel Y13 and the target Y pixel Y12 is |Y12-Y13|. As shown in FIG. 4C, according to the similarity Dif13, the image processor 120 can correspondingly find a second weighting value A2.

Thus, according to the similarities between the target Y pixel Y12 and the adjacent pixels Y10-Y11 at its left side and the similarities between the target Y pixel Y12 and the adjacent pixels Y13-Y14 at its right side, the image processor 120 can determine the second weighting values A0-A3 of the adjacent pixels Y10-Y11 and Y13-Y14. As shown in FIG. 4D, the adjacent Y pixels at the right side and the left side of the target Y pixel Y12 can be determined according to the size of the mask or actual needs, and is not limited to that disclosed herein.

Finally, the image processor 120 executes the weighted average calculation with respect to the target Y pixel Y12 and the adjacent Y pixels Y10-Y11 and Y13 and Y14 at its right side and its left side according to the second weighting values A0-A3 to generate a first low-pass pixel LP1 (step S440). The calculation of the first low-pass pixel LP1 is similar to the calculation of the edge-protection low-pass pixel EPF (i.e. the first low-pass pixel LP1=((128-(A0+A1+A2+A3))*Y12+A0*Y10+A1*Y11+A2*Y13+A3*Y14)/128). However, the calculation of the first low-pass pixel LP1 can be designed according to actual needs, and is not limited to that disclosed herein.

According to the above descriptions, when the similarities indicate that the target Y pixel is highly relevant to its adjacent pixels (i.e. the absolute difference between the target Y its adjacent pixels is small), the noise suppression is not needed by the target Y pixel. On the other hand, when the similarities indicate that the target Y pixel is less relevant to its adjacent pixels (i.e. the absolute difference between the target Y its adjacent pixels is large), the noise suppression is needed by the target Y pixel. Thus, the image processor 120 can implement the noise suppression for the entire input image Im according to the similarities between the target Y pixel and its adjacent pixels.

In FIG. 3, after the image processor 120 generates the first low-pass pixel Lp1 (step S310), the image processor 120 determines whether the target Y pixel is an edge pixel according to a total gradient variation (step S320). In this embodiment, there are four kinds of orientations of the edge pixel including the vertical orientation, the horizontal orientation, the diagonal orientation, the positive diagonal orientation and the negative diagonal orientation as shown in FIGS. 5A-5D. The image processor 120 calculates the total gradient variation of the target Y pixel Y12 of at least one orientation.

In one example, the image processor 120 calculates a gradient variation Gv of the target Y pixel Y12 of the vertical orientation and a gradient variation Gh of the target Y pixel Y12 of the horizontal orientation, and then sums up the gradient variation Gv and the gradient variation Gh to have a total gradient variation Gtotal. In another example, the image processor 120 calculates a gradient variation Gv of the target Y pixel Y12 of the vertical orientation, a gradient variation Gh of the target Y pixel Y12 of the horizontal orientation, a gradient variation G+45 of the target Y pixel Y12 of the positive diagonal orientation and a gradient variation G−45 of the target Y pixel Y12 of the negative diagonal orientation, and then sums up the gradient variation Gv, the gradient variation Gh, the gradient variation G+45 and the gradient variation G−45 to have a total gradient variation Gtotal. It should be noted that, those skilled in the art should understand the calculation of the total gradient variation, and thus details about calculating the total gradient variation are omitted herein.

Figure 5A:
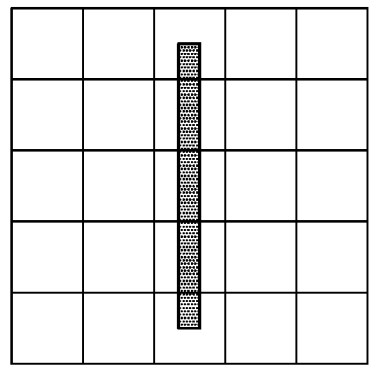
FIG. 5A shows a schematic diagram of edge pixels of which the orientation is vertical according to one embodiment of the present disclosure.
Figure 5B:
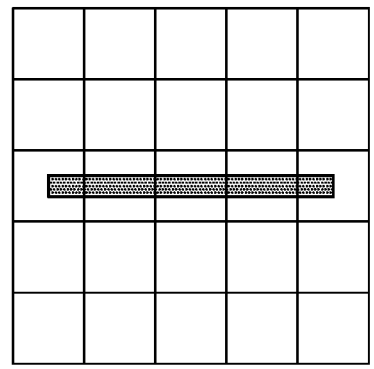
FIG. 5B shows a schematic diagram of edge pixels of which the orientation is horizontal according to one embodiment of the present disclosure.
Figure 5C:
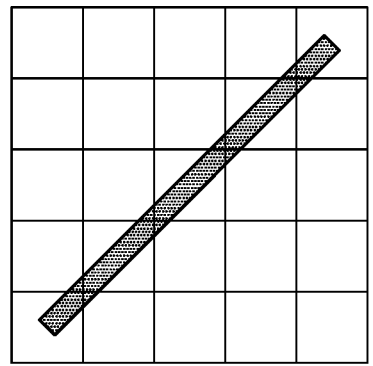
FIG. 5C shows a schematic diagram of edge pixels with a positive diagonal orientation according to one embodiment of the present disclosure.
Figure 5D:
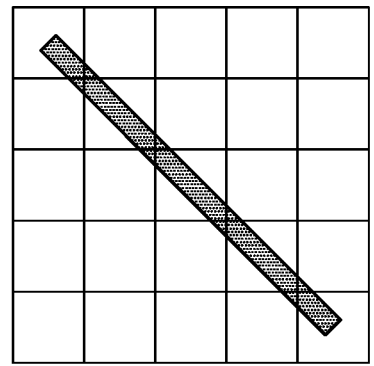
FIG. 5D shows a schematic diagram of edge pixels with a negative diagonal orientation according to one embodiment of the present disclosure.
Figure 5E:
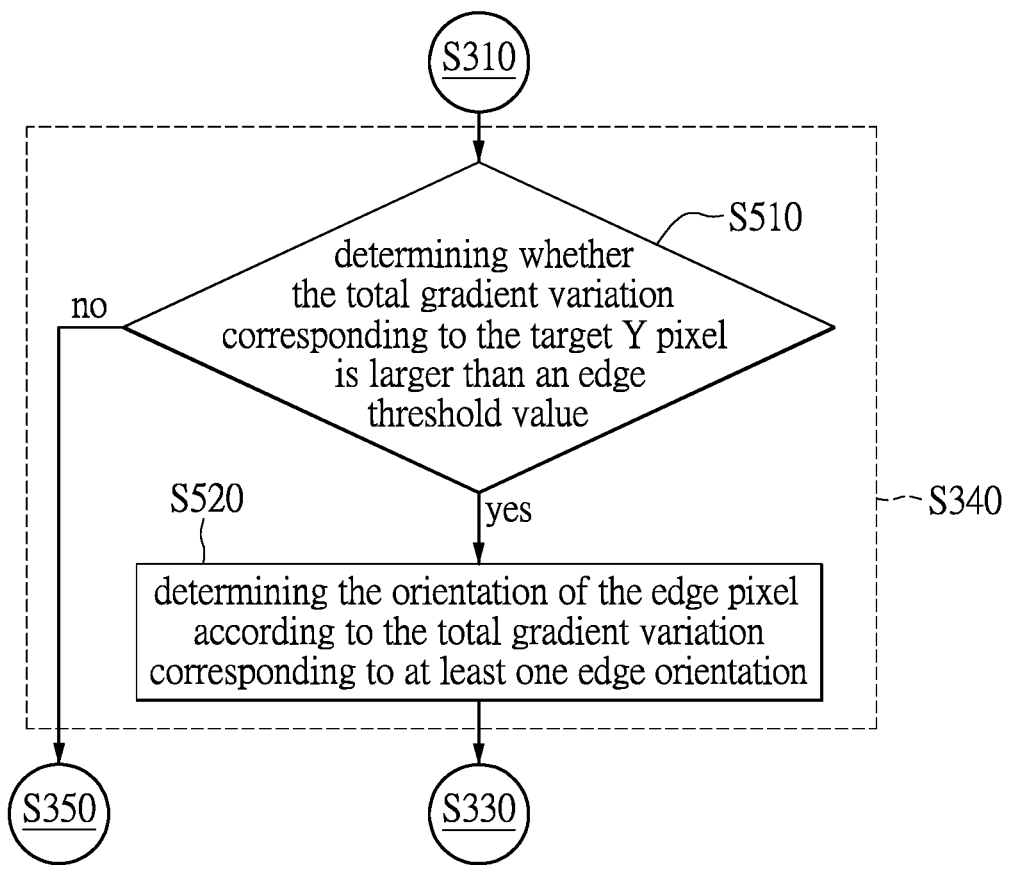
FIG. 5E is a flow chart showing how to determine whether the target Y pixel is an edge pixel according to one embodiment of the present disclosure.

As shown in FIG. 5E, the image processor 120 futher determines whether the total gradient variation corresponding to the target Y pixel is larger than an edge threshold value (step S510). When the total gradient variation is larger than or equal to the edge threshold, the image processor 120 determines that the target Y pixel is the edge pixel. Then, the image processor 120 determines the orientation of the edge pixel according to the total gradient variation corresponding to at least one edge orientation (step S520).

If the total gradient variation Gtotal=the gradient variation Gv of the target pixel of the vertical orientation+the gradient variation Gh of the target pixel of the horizontal orientation, when the gradient variation Gh is larger than the the gradient variation Gv, the image processor 120 determines the orientation of the edge pixel to be vertical. On the other hand, when the gradient variation Gv is larger than the the gradient variation Gh, the image processor 120 determines the orientation of the edge pixel to be horizontal. However, the image processor 120 can also determine the orientation of the edge pixel in other ways, so that how the image processor 120 determines the orientation of the edge pixel is not restricted herein.

When the total gradient variation is smaller than the edge threshold value, the image processor 120 determines that the target Y pixel is not the edge pixel. Then, the image processor 120 executes the step S350, details of which will be mentioned in later descriptions.

According to the step S320 in FIG. 3 and the steps S510-S520, when the the target Y pixel Y12 is the edge pixel, the low-pass filtering process is executed by the image processor 120 according to an orientation of the edge pixel with respect to the target Y pixel Y12 and its adjacent pixels corresponding to the orientation to generate a second low-pass pixel Lp2 (step S330). In this embodiment, the image processor 120 executes the low-pass filtering process by using an infinite impulse response (IIR) filter to generate the second low-pass pixel Lp2.

In step S330, the image processor 120 determines a third weighting value according to the similarities among the target Y pixel and its adjacent pixels corresponding to the orientation. The similarities are defined as a difference between the target Y pixel and an adjacent pixel, and each similarity corresponds to a third weighting value.

Figure 5F:
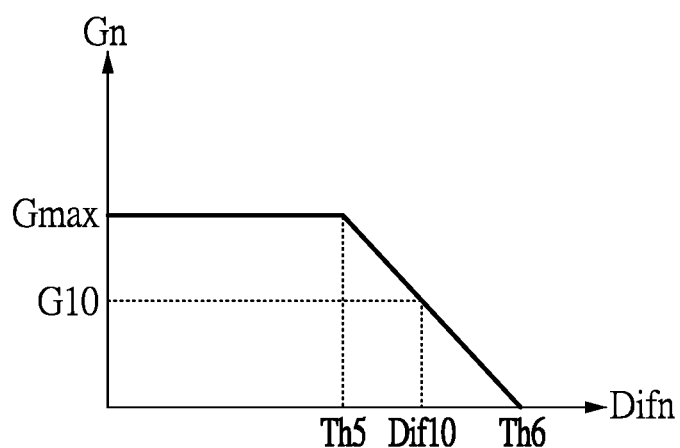
FIG. 5F is a relationship diagram showing similarities between the target Y pixel and its adjacent pixels and the third weighting value according to one embodiment of the present disclosure.

In one example, the orientation of the edge pixel is horizontal, and as shown in FIG. 2A, the demonstrated pixels of the input image forms a 5×5 mask having the pixel P12 as a center. Referring to FIG. 5F, a relationship diagram showing similarities between the target Y pixel and its adjacent pixels and the third weighting value according to one embodiment of the present disclosure is shown. The maximum third weighting value Gmax, the first threshold value Th5 and the second threshold value Th6 can be defined by a user. For the adjacent pixel Y10, after the image processor 120 obtains the similarity Dif10 between the adjacent pixel Y10 and the target pixel Y12, which is |Y12-Y10|, the image processor 120 can find the third weighting value G10 corresponding to the similarity Dif10 (|Y12−Y10|) in FIG. 5.

According to the similarities between the adjacent pixels Y10, Y11, Y13 and Y14 and the target Y pixel Y12, the image processor 120 can determine the third weighting values W10, W11, W13 and W14 of the adjacent pixels Y10, Y11, Y13 and Y14.

After that, the image processor 120 executes the weighted average calculation with respect to the target Y pixel Y12 and its adjacent pixels Y10, Y11, Y13 and Y14 corresponding to the orientation according to the third weighting values W10, W11, W13 and W14 to generate the second low-pass pixel Lp2. Thus, in the above example, the second low-pass pixel Lp2 will be ((128−(W10+W11+W13+W14))*Y12+ W10*Y10+W11*Y11+W13*Y13+W14*Y14)/128. It should be noted that, the calculation of the second low-pass pixel Lp2 can be adjusted according to actual needs, and is not limited that disclosed herein.

Figures 6A, 6B:
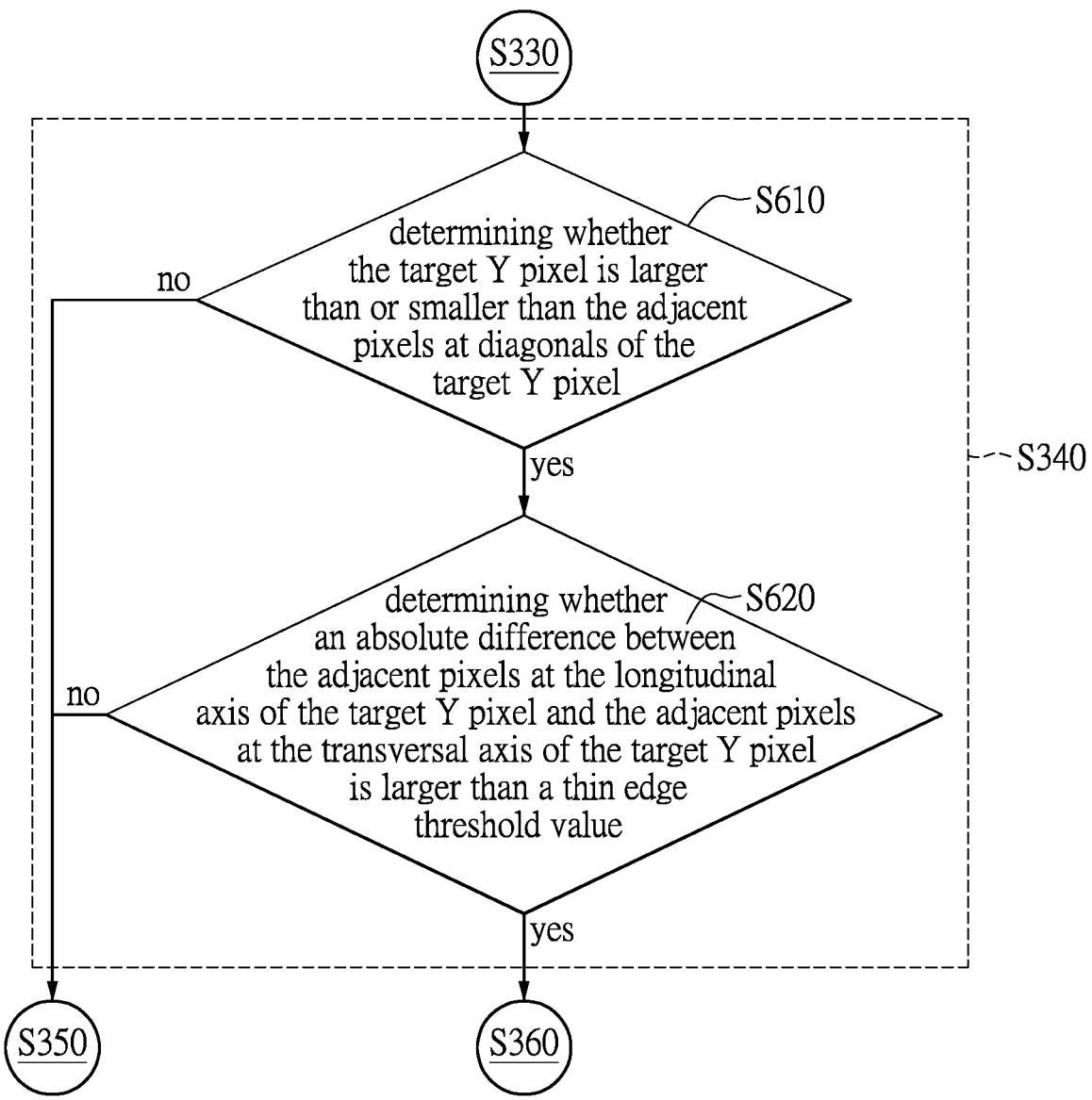
FIG. 6A is a flow chart showing how to determine whether the target Y pixel is a thin edge pixel according to one embodiment of the present disclosure.
FIG. 6B shows a schematic diagram of a 3×3 mask formed by the target Y pixel Y12 according to one embodiment of the present disclosure.

Referring to FIG. 6A, a flow chart showing how to determine whether the target Y pixel is a thin edge pixel according to one embodiment of the present disclosure is shown. After the step S330, the image processor 120 determines whether the target Y pixel is a thin edge pixel in order to execute the edge enhancement for thinner edge pixels of the input image Im. Specifically, the image processor 120 determines whether the target Y pixel is larger than or smaller than the adjacent pixels at diagonals of the target Y pixel (step S610).

If the target Y pixel is not the thin edge pixel, the image processor 120 executes the step S350, but if the target Y pixel is the thin edge pixel, the image processor 120 determines whether an absolute difference between the adjacent pixels at the vertical axis of the target Y pixel and the adjacent pixels at the horizontal axis of the target Y pixel is larger than a thin edge threshold value (step S620).

When the absolute difference is smaller than or equal to the thin edge threshold value, the image processor 120 determines that the target Y pixel is not the thin edge pixel and thus executes the step S350. On the other hand, when the absolute difference is larger than the thin edge threshold value, the image processor 120 determines that the target Y pixel is the thin edge pixel and thus executes the step S360.

Referring to FIG. 6B, a schematic diagram of a 3×3 mask formed by the target Y pixel Y12 according to one embodiment of the present disclosure is shown. The image processor 120 determines whether the target Y pixel Y12 is larger than or smaller than the adjacent pixels Y6, Y8, Y16 and Y18 at diagonals of the target Y pixel Y12. If the target Y pixel Y12 is not larger than or smaller than the adjacent pixels Y6, Y8, Y16 and Y18, the image processor 120 determines that the target Y pixel Y12 is not a thin edge pixel. However, if the target Y pixel Y12 is larger than or smaller than the adjacent pixels Y6, Y8, Y16 and Y18, thet image processor 120 further determines whether an absolute difference between the adjacent pixels Y7 and Y17 at the vertical axis of the target Y pixel Y12 and the adjacent pixels Y11 and Y13 at the horizontal axis of the target Y pixel Y12 is larger than a thin edge threshold value.

When the above absolute differences are smaller than or equal to the thin edge threshold value, thet image processor 120 determines that the target Y pixel is not a thin edge pixel and thus the image processor 120 executes the step S350. On the other hand, when the above absolute differences are larger than the thin edge threshold value, the image processor 120 determines that the target Y pixel is a thin edge pixel and thus the image processor 120 executes the step S360.

Figures 7A, 7B, 8:
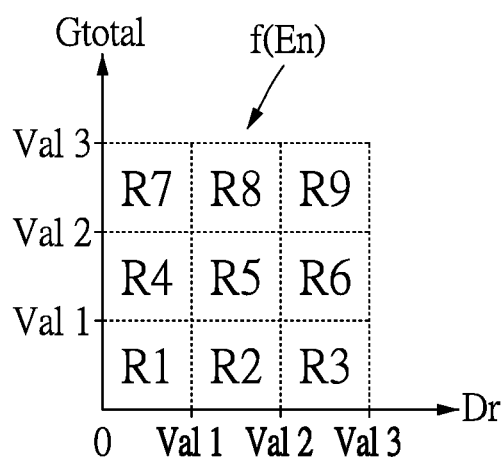
FIG. 7A shows a schematic diagram of a first mask according to one embodiment of the present disclosure.
FIG. 7B shows a schematic diagram of a first mask according to another embodiment of the present disclosure.
FIG. 8 shows a function graph of an enhancement function according to one embodiment of the present disclosure.

According to the above descriptions, when the target Y pixel is not an edge pixel or a thin edge pixel, the image processor 120 calculates an edge response between the target Y pixel and its adjacent pixels according to a first mask, such as the first mask MS1 in FIG. 7A (step S350). Thus, the edge response will be −2*P0−3*P1−3*P2−3*P3− 2*P4−3*P5−1*P6+4*P7−1*P8−3*P9−3*P10+4*P11+ 24*P12+4*P13−3*P14−3*P15−1*P16+4*P17−1*P18− 3*P19−2*P20−3*P21−3*P22−3*P23−2*P24. It should be noted that, although the orientation in the first mask MS1 in FIG. 7A is not considered, the first mask MS2 in FIG. 7B with orientation considered can also be used to calculate the edge response.

When the target Y pixel is a thin edge pixel, the image processor 120 calculates the edge response between the target Y pixel and its adjacent pixels according to a second mask (step S360). The coefficients of the first mask and the second mask can be freely designed, and is not limited to that disclosed herein.

It is worth mentioning that, the first mask is used when the target Y Pixel is not an edge pixel or not a thin edge pixel, and the second mask is used when the edge pixel is a thin edge pixel. The coefficients of the second mask are larger than the coefficients of the first mask, such that the thin edge pixels can be more enhanced by the image processor 120. Thus, the edge response calculated according to the second mask will be larger than the edge response calculated according to the first mask.

After obtaining the edge response by executing step S350 and step S360, the image processor 120 calculates an enhanced pixel corresponding to the total gradient variation and the edge response according to an enhancement function S370. In this embodiment, the enhancement function f(En) is relevant to the total gradient variation Gtotal and the edge response Dr. Referring to FIG. 8, a function graph of an enhancement function according to one embodiment of the present disclosure is shown. As shown in FIG. 8, a 2D area with respect to the total gradient variation Gtotal and the edge response Dr is divided into nine regions R1, R2, R3, R4, R5, R6, R7, R8 and R9 according to gain parameters Va11, Va12 and Va13 set by a user. The regions R1, R2, R3, R4, R5, R6, R7, R8 and R9 correspond respectively to coefficients C1, C2, C3, C4, C5, C6, C7, C8 and C9.

The enhanced pixel is defined as the product of the coefficient and the enhancement amplitude, and the enhancement amplitude can be set by the user. For example, the enhanced pixel can be the coefficient C3*100. If a high image sharpness is required, the enhancement amplitude should be set as a larger value; however, if a low image sharpness is required, the enhancement amplitude should be set as a smaller value.

The larger the total gradient variation Gtotal is, the larger the enhanced pixel will be. On the other hand, the smaller the total gradient variation Gtotal is, the smaller the enhanced pixel will be. In addition, the larger the edge response Dr is, the larger the edge response will be, but the smaller the edge response Dr is, the smaller the edge response will be.

After obtaining the enhanced pixel, the image processor 120 adds the enhanced pixel to the second low-pass pixel to generate an output Y pixel. In the above examples, after obtaining the enhanced pixel of the target Y pixel Y12, the image processor 120 adds the enhanced pixel to the second low-pass pixel Lp2 to generate an output Y pixel Y12'.

According to the above descriptions, briefly, the image enhancement apparatus 100 executes the edge enhancement and the brightness noise suppression for each of Y pixels Y0-Yn of the input image Im, and then generates the output Y pixels Y0'-Yn'.

In the following embodiment, the image enhancement apparatus executes the chroma suppression for each of U pixels U0-Un of the input image Im to generate output U pixels U0'-Un'. For ease of illustration, as shown in FIG. 2B, the pixel P12 and its adjacent pixels P0-P11 and P13-P24 of the input image Im (i.e. a 5×5 mask having the pixel P12 as a center) are used for illustrating this embodiment.

Figure 9:
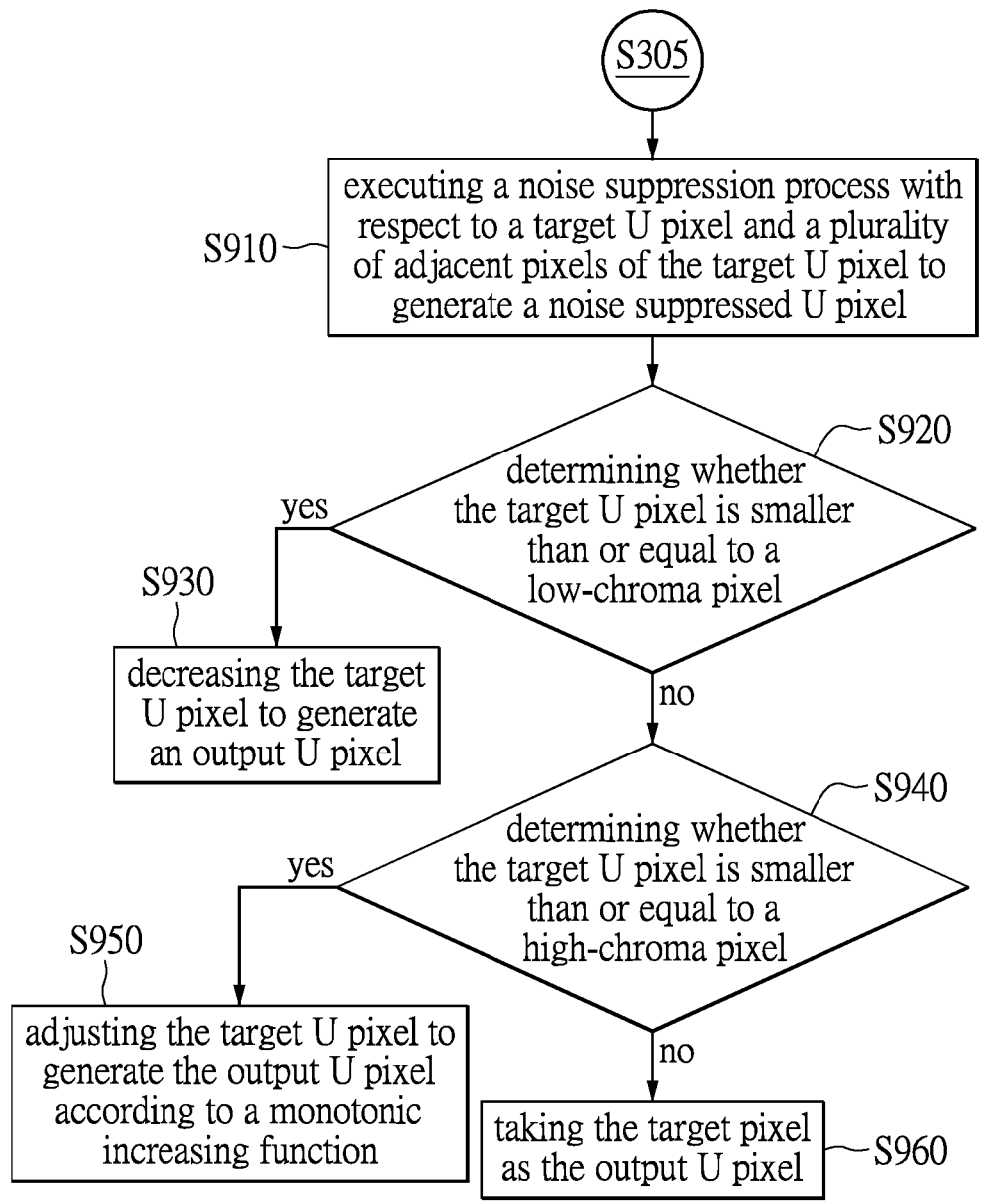
FIG. 9 is a flow chart showing how to enhance U pixels according to one embodiment of the present disclosure.

Referring to FIG. 9, a flow chart showing how to enhance U pixels according to one embodiment of the present disclosure is shown. After step S305, the image processor 120 sequentially takes each of the U pixels U0-U24 of the pixels P0-P24 as a target pixel for adjustment. First, the image processor 120 executes a noise suppression process with respect to a target U pixel U12 and a plurality of adjacent pixels U0-U11 and U13-U24 of the target U pixel U12 to generate a noise suppressed U pixel U1pf (step S910).

Figure 10:
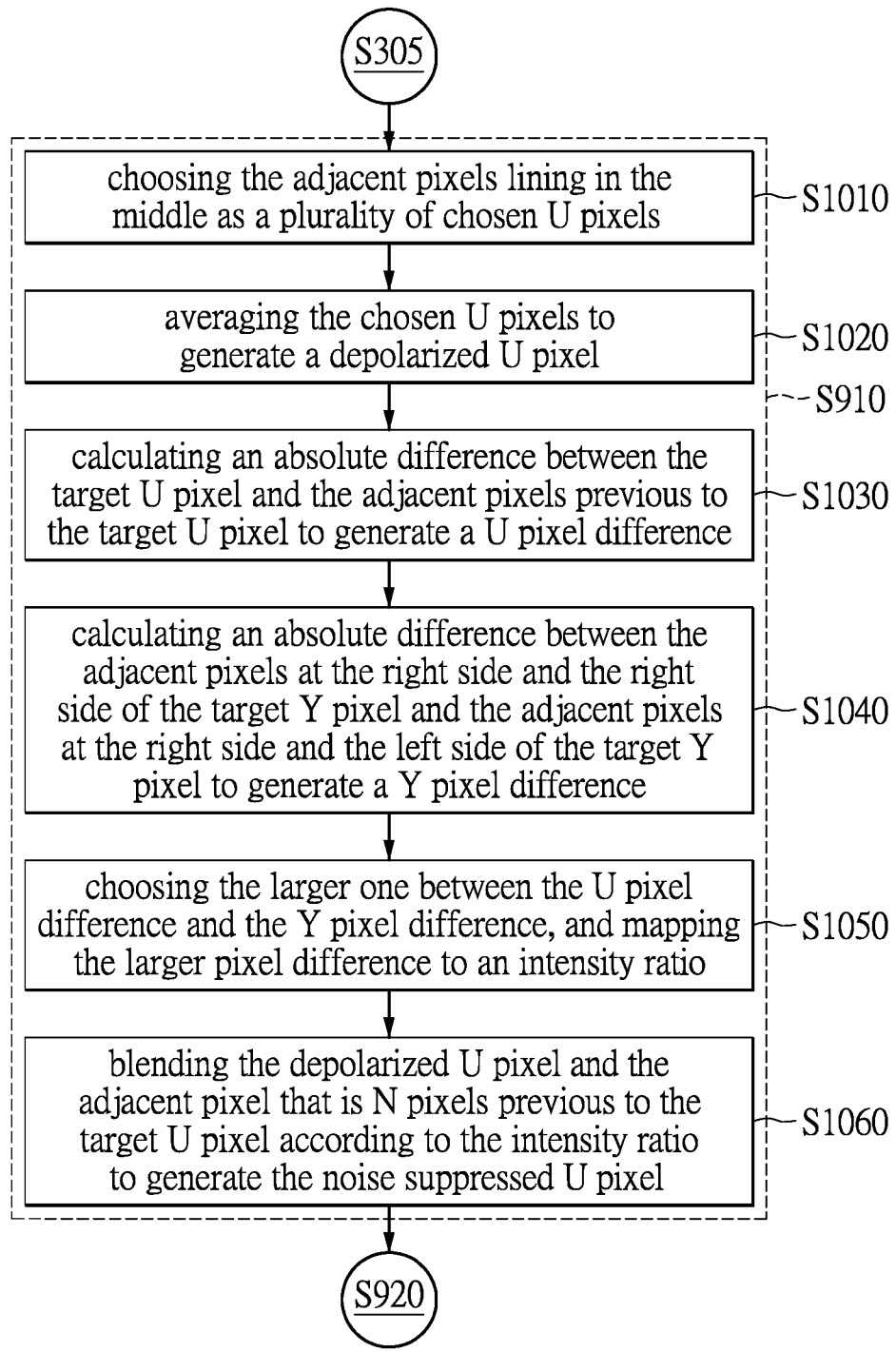
FIG. 10 is a flow chart showing how to generate a noise suppressed U pixel according to one embodiment of the present disclosure.

FIG. 10 is a flow chart showing how to generate the noise suppressed U pixel according to one embodiment of the present disclosure, and FIG. 11A shows a schematic diagram of the depolarized U pixel and the U pixel difference according to one embodiment of the present disclosure. As shown in FIG. 11A, the adjacent pixels at the vertical axis of the target U pixel U12, such as U2 and U22, and the adjacent pixels at the horizontal axis of the target U pixel U12, such as U10 and U14, are sequentially arranged by the image processor 120 according to their pixel values (i.e. U2→U22→U10→U14). Then, among the adjacent pixels U2, U22, U10 and U14, the image processor 120 chooses the adjacent pixels arranged in the middle as a plurality of chosen U pixels (i.e. the adjacent pixels U22 and U10). In addition, the adjacent pixels at diagonals of the target U pixel U12, such as U0, U4, U20 and U24, are sequentially arranged by the image processor 120 according to their pixel values (i.e. U0→U4→U20→U24). Then, among the adjacent pixels U0, U4, U20 and U24, the image processor 120 chooses the adjacent pixels arranged in the middle as a plurality of chosen U pixels (i.e. the adjacent pixels U4 and U20). In this manner, the intermediate values at different orientations of the target U pixel U12 can be obtained.

The image processor 120 averages the chosen U pixels to generate a depolarized U pixel (step S1020). According to the above examples and FIG. 11A, the depolarized U pixel Ufcr will be (U22+U10+U4+U20)/4. Thus, the extreme values among the adjacent pixels of the target U pixel U12 can be excluded to suppress the chroma noises around the target U pixel U12.

After that, the image processor 120 calculates an absolute difference between the target U pixel and the adjacent pixel which is N pixels previous to the target U pixel to generate a U pixel difference (step S1030). According to the above examples and FIG. 11A, the image processor 120 calculates an absolute difference between the target U pixel U12 and the adjacent pixel U10 which is two pixels previous to the target U pixel U12 to generate a U pixel difference Udiff, which is |Y12−Y10|.

The image processor 120 calculates an absolute difference between the adjacent pixels at the right side of the target Y pixel and the adjacent pixels at the left side of the target Y pixel to generate a Y pixel difference (step S1040). As shown in FIG. 11B, the image processor 120 chooses the adjacent pixels Y0-Y1, Y5-Y6, Y10-Y11, Y15-Y16 and Y20-Y21 at the left side of the target Y pixel Y12 and calculates an average Ymean1 of them, which will be (Y0+Y1+Y5+Y6+Y10+Y11+Y15+Y16+Y20+Y21)/10. In addition, the image processor 120 chooses the adjacent pixels Y3-Y4, Y8-Y9, Y13-Y14, Y18-Y19 and Y23-Y24 at the right side of the target Y pixel Y12 and calculates an average Ymean2 of them, which will be (Y3+Y4+Y8+Y9+Y13+Y14+Y18+Y19+Y23+Y24)/10. Then, the image processor 120 calculates an absolute difference the average Ymean1 and Ymean2, which is |Ymean1-Ymean2|, to generate a Y pixel difference.

The chosen adjacent pixels at the right side and the left side of the target Y pixel can be determined according to practical needs. For example, at the left side of the target Y pixel, the chosen adjacent pixels can also be the adjacent pixels Y0, Y5, Y10, Y15 and Y20, at the right side of the target Y pixel, the chosen adjacent pixels can also be the adjacent pixels Y4, Y9, Y14, Y19 and Y24.

Figure 12:
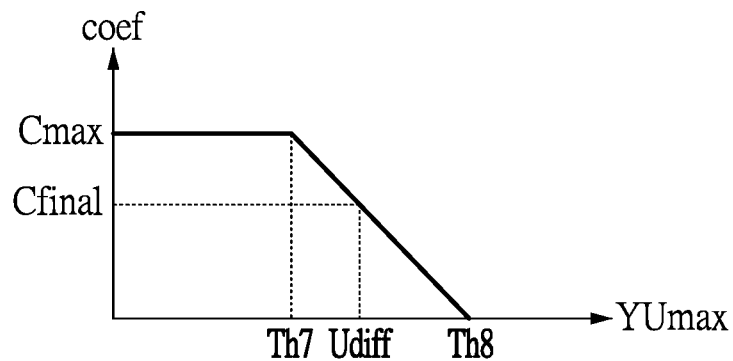
FIG. 12 shows a curve diagram of the intensity ratio according to one embodiment of the present disclosure.

The image processor 120 chooses the larger one between the U pixel difference and the Y pixel difference, and maps the larger pixel difference to an intensity ratio (step S1050). Referring to FIG. 12, a curve diagram of the intensity ratio according to one embodiment of the present disclosure is shown. The intensity ratio Cmax, the first threshold value Th7 and the second threshold value Th8 can be set by the user. Assuming that the U pixel difference Udiff is larger than the Y pixel difference Ydiff, the image processor 120 chooses the U pixel difference Udiff and maps the U pixel difference Udiff to the intensity ratio Cfinal.

Finally, the image processor 120 blends the depolarized U pixel and the adjacent pixel that is N pixels previous to the target U pixel according to the intensity ratio to generate the noise suppressed U pixel U1pf (step S1060). The noise suppressed U pixel U1pf=(1-the intensity ratio Cfinal)*(the depolarized U pixel Ufcr)+(the intensity ratio Cfinal)*(the adjacent pixel that is N pixels previous to the target U pixel). However, the calculation of the noise suppressed U pixel U1pf is not restricted herein.

By executing steps S1010-S1060, the image processor 120 can generate the noise suppressed U pixel U1pf. In the noise suppressed U pixel U1pf, the chroma noises of the target U pixel are suppressed. However, for an image with a low light source, the chroma noises cannot be all suppressed. In light of the foregoing, the low-chroma pixels are considered pixels that are affected by noises, and the high-chroma pixels are considered pixels that are not affected by noises.

Thus, after step S910, the image processor 120 determines whether the target U pixel is smaller than or equal to a low-chroma pixel (step S920). When the target U pixel is smaller than or equal to the low-chroma pixel, the image processor 120 decreases the target U pixel to generate an output U pixel (step S930).

When the target U pixel is larger than the low-chroma pixel, the image processor 120 further determines whether the target U pixel is smaller than or equal to a high-chroma pixel (step S940). When the target U pixel is smaller than or equal to the high-chroma pixel, the image processor 120 adjusts the target U pixel to generate the output U pixel according to a monotonic increasing function (step S950). On the other hand, when the target U pixel is larger than the high-chroma pixel, the image processor 120 takes the target pixel as the output U pixel (step S960).

Figure 13:
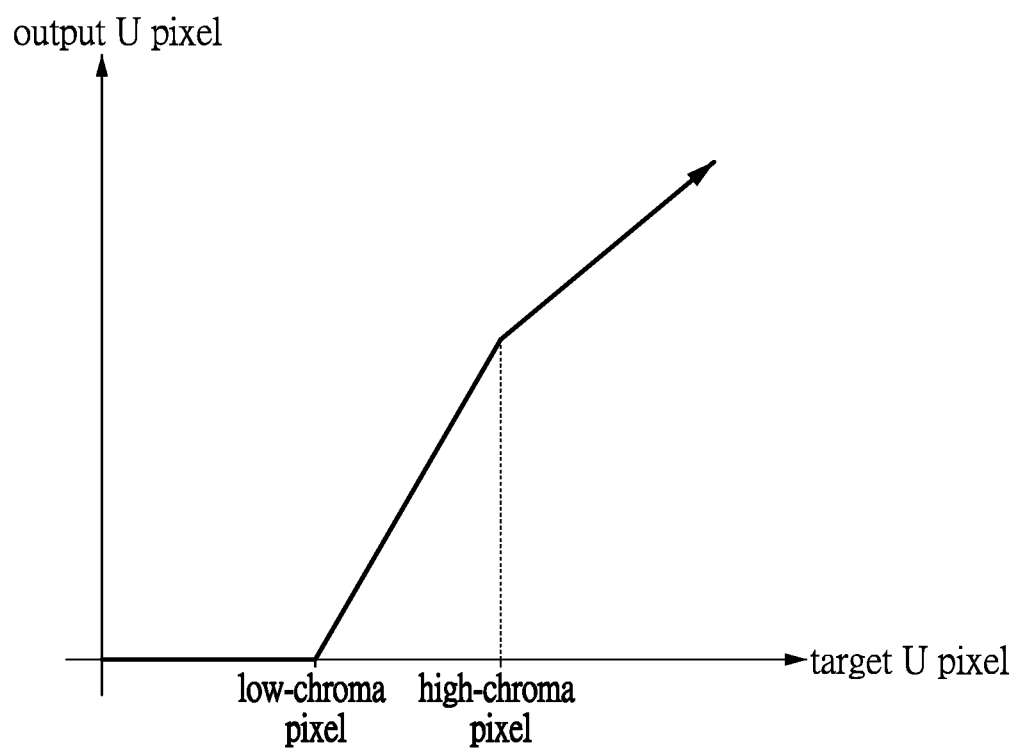
FIG. 13 shows a curve diagram of the target U pixel and the output U pixel according to one embodiment of the present disclosure.

Referring to FIG. 13, a curve diagram of the target U pixel and the output U pixel according to one embodiment of the present disclosure is shown. As shown in FIG. 13, assuming that the low-chroma pixel is 128 and the high-chroma pixel is 160, the image processor 120 decreases the target U pixel U12 to generate an output U pixel U12' when the target U pixel U12 is smaller than the low-chroma pixel. For example, the target U pixel U12 can be decreased to zero. On the other hand, the image processor 120 adjusts the target U pixel U12 to generate the output U pixel U12' according to a monotonic increasing function when the target U pixel U12 is larger than the low-chroma pixel and is smaller than or equal to the high-chroma pixel. In addition, when the target U pixel U12 is larger than the high-chroma pixel, the image processor 120 takes the target U pixel U12 as the output U pixel U12'.

Therefore, the image enhancement apparatus 100 can suppress the chroma noises of each of the U pixels U0'-Un' of the input image Im to accordingly generate the output U pixels U0'-Un'.

In the following embodiment, the image enhancement apparatus executes the chroma suppression for each of V pixels V0-Vn of the input image Im to generate output V pixels V0'-Vn'. For ease of illustration, as shown in FIG. 2B, the pixel P12 and its adjacent pixels P0-P11 and P13-P24 of the input image Im (i.e. a 5×5 mask having the pixel P12 as a center) are used for illustrating this embodiment.

Figure 14:
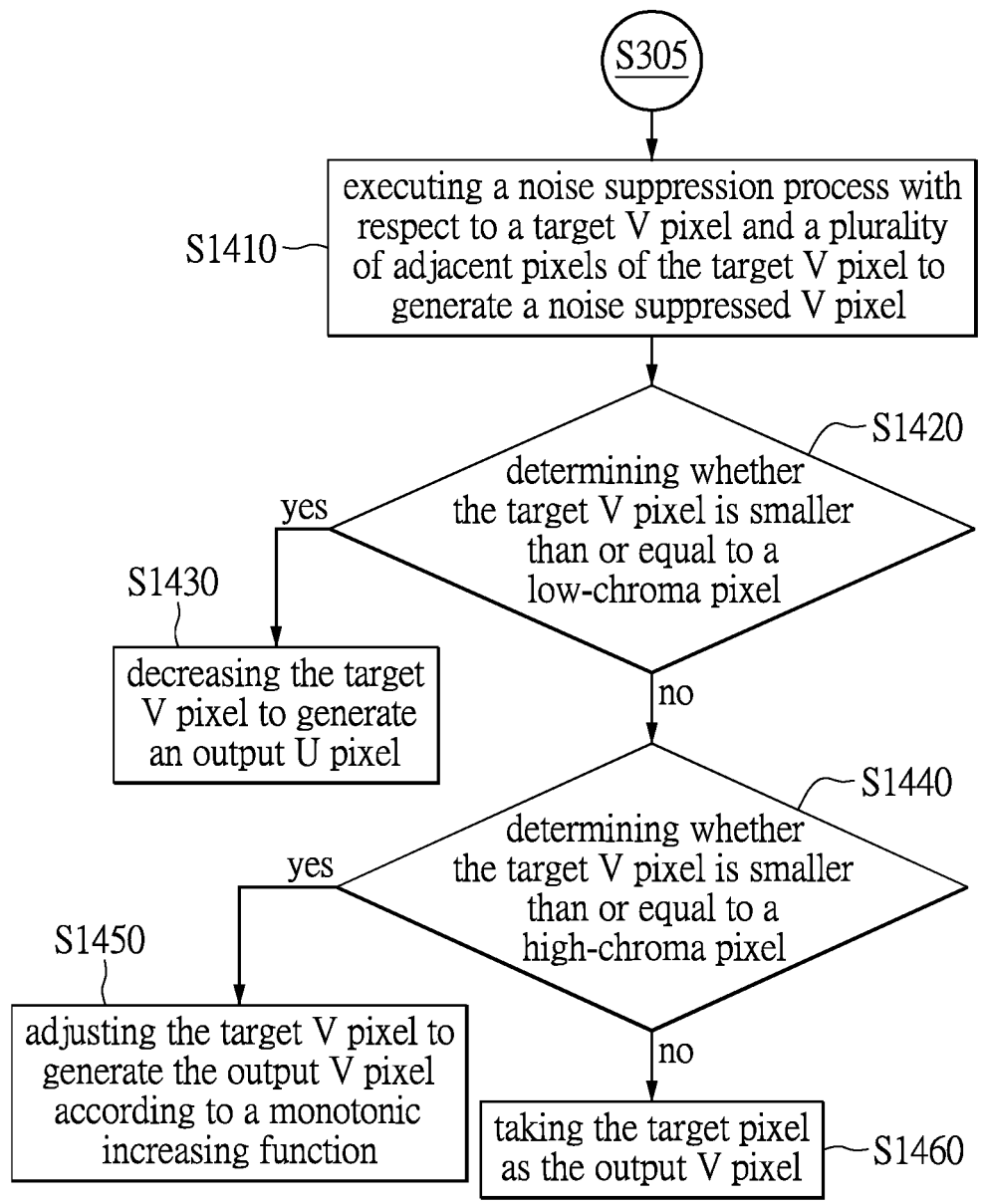
FIG. 14 is a flow chart showing how to enhance V pixels according to one embodiment of the present disclosure.

FIG. 14 is a flow chart showing how to enhance V pixels according to one embodiment of the present disclosure. As shown in FIG. 14 and FIG. 2C, after step S305, the image processor 120 sequentially takes each of the V pixels V0-V24 of the pixels P0-P24 as a target pixel for adjustment. First, the image processor 120 executes a noise suppression process with respect to a target V pixel V12 and a plurality of adjacent pixels V0-V11 and V13-V24 of the target V pixel V12 to generate a noise suppressed V pixel V1pf (step S1410).

Figure 15:
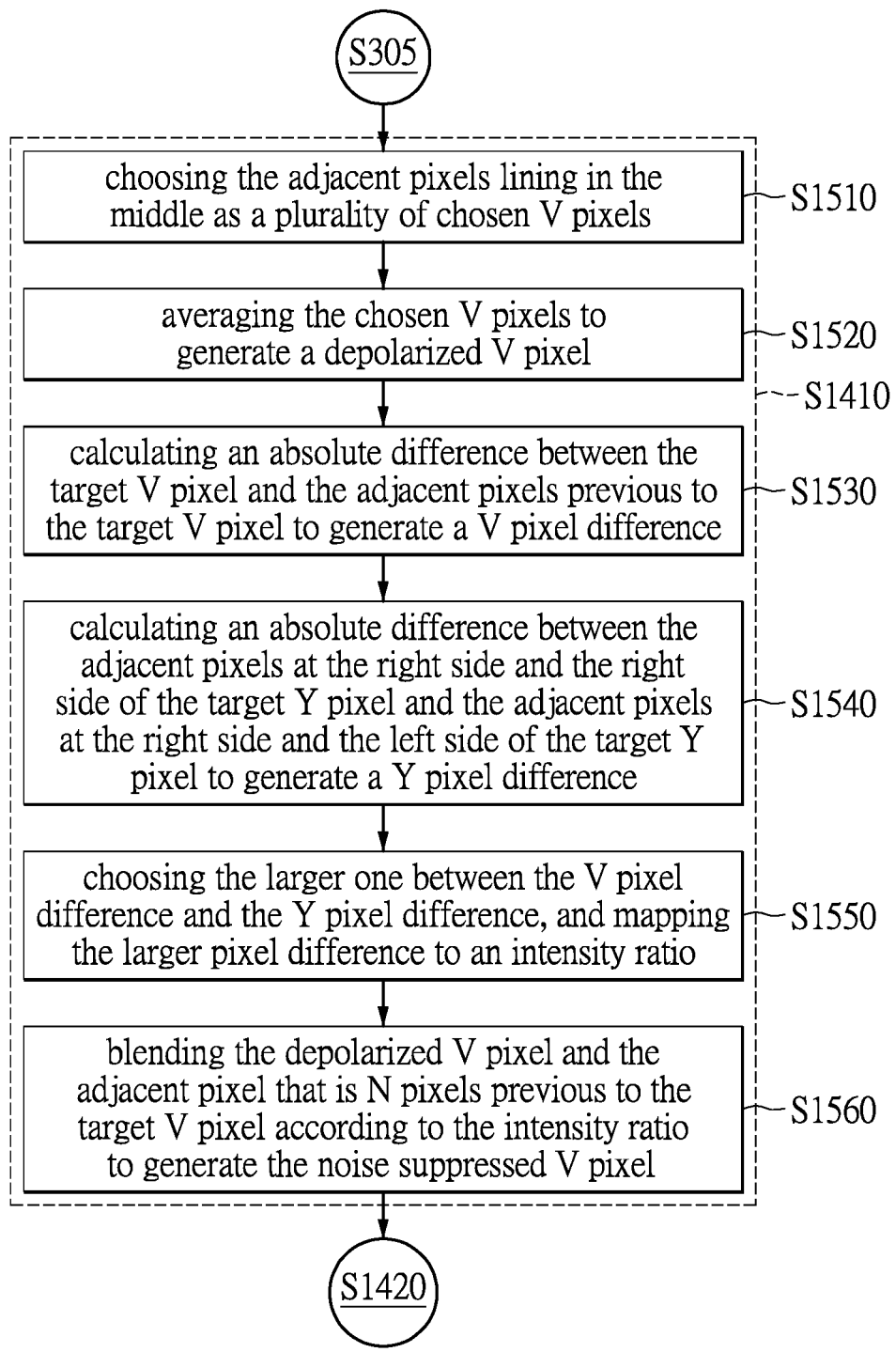
FIG. 15 is a flow chart showing how to generate the noise suppressed V pixel according to one embodiment of the present disclosure.

Referring to FIG. 15, a flow chart showing how to generate the noise suppressed V pixel according to one embodiment of the present disclosure is shown. As shown in FIG. 15, among the adjacent pixels of the target V pixel, the image processor 120 chooses the adjacent pixels arranged in the middle as a plurality of chosen V pixels (step S1510). Then, the image processor 120 averages the chosen V pixels to generate a depolarized V pixel (step S1520). By executing these steps, the extreme values among the adjacent pixels of the target V pixel can be excluded to suppress the chroma noises around the target V pixel.

After that, the image processor 120 calculates an absolute difference between the target V pixel and the adjacent pixels previous to the target V pixel to generate a V pixel difference (step S1350). Then, the image processor 120 calculates an absolute difference between the adjacent pixels at the right side of the target Y pixel and the adjacent pixels at the left side of the target Y pixel to generate a Y pixel difference.

The image processor 120 chooses the larger one between the V pixel difference and the Y pixel difference, and maps the larger pixel difference to an intensity ratio (step S1550). Finally, the image processor 120 blends the depolarized V pixel and the adjacent pixel that is N pixels previous to the target V pixel according to the intensity ratio to generate the noise suppressed V pixel V1pf (step S1560). Details about steps S1510-S1560 can be derived from steps S1010-S1060, and thus relevant descriptions are omitted herein.

By executing steps S1510-S156, the image processor 120 can generate the noise suppressed V pixel V1pf to suppress the chroma noises of the target V pixel. However, for an image with a low light source, the chroma noises cannot be all suppressed. In light of the foregoing, the low-chroma pixels are considered pixels that are affected by noises, and the high-chroma pixels are considered pixels that are not affected by noises.

Thus, after step S1410, the image processor 120 determines whether the target V pixel is smaller than or equal to a low-chroma pixel (step S1420). When the target V pixel is smaller than or equal to the low-chroma pixel, the image processor 120 decreases the target V pixel to generate an output U pixel (step S1430).

When the target V pixel is larger than the low-chroma pixel, the image processor 120 further determines whether the target V pixel is smaller than or equal to a high-chroma pixel (step S1440). When the target V pixel is smaller than or equal to the high-chroma pixel, the image processor 120 adjusts the target V pixel to generate the output V pixel according to a monotonic increasing function (step S1450). On the other hand, when the target V pixel is larger than the high-chroma pixel, the image processor 120 takes the target pixel as the output V pixel (step S960). Details about steps S1420-S1460 can be derived from steps S920-S960, and thus relevant descriptions are omitted herein.

Therefore, the image enhancement apparatus 100 can suppress the chroma noises of each of the V pixels V0'-Vn' of the input image Im to accordingly generate the output U pixels V0'-Vn'.

To sum up, the image enhancement method and the image enhancement apparatus provided by the present disclosure can realize the edge enhancement for an image generated after a demosaicing process according to local characteristics of an input image (i.e. the image sharpening) and can realize the brightness noise suppression and the chroma noise suppression for the image. Thus, by using the image enhancement method and the image enhancement apparatus provided by the present disclosure, clear images can be generated.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An image enhancement method, adapted to an image enhancement apparatus, comprising:
sequentially obtaining pixels of an input image in a YUV color space, wherein each pixel includes a Y pixel, a U pixel and a V pixel;
executing a low-pass filtering process with respect to a target Y pixel and a plurality of adjacent pixels of the target Y pixel to generate a first low-pass pixel;
determining whether the target Y pixel is an edge pixel according to a total gradient variation, wherein when the target Y pixel is the edge pixel, the low-pass filtering process is executed according to an orientation of the edge pixel with respect to the target Y pixel and the adjacent pixels corresponding to the orientation to generate a second low-pass pixel;
determining whether the target Y pixel is a thin edge pixel, wherein when the target Y pixel is not the thin edge pixel, an edge response between the target Y pixel and the adjacent pixels is calculated according to a first mask, but when the target Y pixel is a thin edge pixel, the edge response between the target Y pixel and the adjacent pixels is calculated according to a second mask, and the edge response calculated according to the second mask is larger than the edge response calculated according to the first mask;
calculating an enhanced pixel corresponding to the total gradient variation and the edge response according to an enhancement function; and
adding the enhanced pixel to the second low-pass pixel to generate an output Y pixel.

2. The image enhancement method according to claim 1, wherein the step of generating the first low-pass pixel includes:
determining a first weighting value of each adjacent pixel in previous rows and in subsequent rows of the target Y pixel according to similarities among the target Y pixel and the adjacent pixels in previous rows and in subsequent rows of the target Y pixel;

executing a weighted average calculation with respect to the target Y pixel and the adjacent pixels in previous rows and in subsequent rows of the target Y pixel according to the first weighting values to generate an edge-protection low-pass pixel;

determining a second weighting value of each adjacent pixel at the right side and the left side of the target Y pixel according to the similarities among the target Y pixel and the adjacent pixels at the right side and the left side of the target Y pixel; and executing the weighted average calculation with respect to the edge-protection low-pass pixel and the adjacent pixels at the right side and the left side of the target Y pixel according to the second weighting values to generate the first low-pass pixel.

3. The image enhancement method according to claim 1, wherein the step of generating the second low-pass pixel includes:

determining a third weighting value according to the similarities among the target Y pixel and the adjacent pixels corresponding to the orientation; and executing the weighted average calculation with respect to the target Y pixel and the adjacent pixels corresponding to the orientation according to the third weighting values to generate the second low-pass pixel.

4. The image enhancement method according to claim 1, wherein the step of determining whether the target Y pixel is the edge pixel includes:

determining whether the total gradient variation corresponding to the target Y pixel is larger than an edge threshold value;

determining that the target Y pixel is the edge pixel when the total gradient variation is larger than or equal to the edge threshold value, and determining the orientation of the edge pixel according to the total gradient variation corresponding to at least one edge orientation; and determining that the target Y pixel is not the edge pixel when the total gradient variation is smaller than the edge threshold value.

5. The image enhancement method according to claim 1, wherein the step of determining whether the target Y pixel is the edge pixel further includes:

calculating the edge response between the target Y pixel and the adjacent pixels according to the first mask when the target Y pixel is not the edge pixel.

6. The image enhancement method according to claim 1, wherein the step of determining whether the target Y pixel is the thin edge pixel includes:

determining whether the target Y pixel is larger than or smaller than the adjacent pixels at diagonals of the target Y pixel;

determining that the target Y pixel is not the thin edge pixel when the target Y pixel is not larger than or not smaller than the adjacent pixels at the diagonals of the target Y pixel, and determining whether an absolute difference between the adjacent pixels at the vertical axis of the target Y pixel and the adjacent pixels at the horizontal axis of the target Y pixel is larger than a thin edge threshold value; and determining that the target Y pixel is not the thin edge pixel when the absolute difference is smaller than or equal to the thin edge threshold value, and determining that the target Y pixel is the thin edge pixel when the absolute difference is larger than the thin edge threshold value.

7. The image enhancement method according to claim 1, in the step of calculating the enhanced pixel according to the enhancement function, the larger the total gradient variation is, the larger the enhanced pixel will be; the smaller the total gradient variation is, the smaller the enhanced pixel will be; the larger the edge response is, the larger the enhanced pixel will be; and the smaller the edge response is, the smaller the enhanced pixel will be.

8. The image enhancement method according to claim 1, wherein the step of sequentially obtaining the pixels of the input image in the YUV color space includes:

executing a noise suppression process with respect to a target U pixel and a plurality of adjacent pixels of the target U pixel to generate a noise suppressed U pixel;

determining whether the target U pixel is smaller than or equal to a low-chroma pixel;

decreasing the target U pixel to generate an output U pixel when the target U pixel is smaller than or equal to the low-chroma pixel, and determining whether the target U pixel is smaller than or equal to a high-chroma pixel when the target U pixel is larger than the low-chroma pixel; and adjusting the target U pixel to generate the output U pixel according to a monotonic increasing function when the target U pixel is smaller than or equal to the high-chroma pixel, but taking the target pixel as the output U pixel when the target U pixel is larger than the high-chroma pixel.

9. The image enhancement method according to claim 8, wherein the step of generating the noise suppressed U pixel includes:

among the adjacent pixels of the target U pixel, choosing the adjacent pixels arranged in the middle as a plurality of chosen U pixels;

averaging the chosen U pixels to generate a depolarized U pixel;

calculating an absolute difference between the target U pixel and the adjacent pixels previous to the target U pixel to generate a U pixel difference;

calculating an absolute difference between the adjacent pixels at the right side and the adjacent pixels at the left side of the target Y pixel to generate a Y pixel difference;

choosing the larger one between the U pixel difference and the Y pixel difference, and mapping the larger pixel difference to an intensity ratio; and blending the depolarized U pixel and the adjacent pixel that is N pixels previous to the target U pixel according to the intensity ratio to generate the noise suppressed U pixel.

10. The image enhancement method according to claim 9, wherein the step of choosing the adjacent pixels arranged in the middle as the chosen U pixels includes:

arranging the adjacent pixels at the vertical axis and the horizontal axis of the target U pixel, and choosing the adjacent pixels arranged in the middle as some of the chosen U pixels; and arranging the adjacent pixels at diagonals of the target U pixel, and choosing the adjacent pixels arranged in the middle as some of the chosen U pixels.

11. The image enhancement method according to claim 1, wherein the step of sequentially obtaining pixels of the input image in the YUV color space includes:

executing a noise suppression process with respect to a target V pixel and a plurality of adjacent pixels of the target V pixel to generate a noise suppressed V pixel;

determining whether the target V pixel is smaller than or equal to a low-chroma pixel;

decreasing the target V pixel to generate an output U pixel when the target U pixel is smaller than or equal to the low-chroma pixel, and determining whether the target V pixel is smaller than or equal to a high-chroma pixel when the target V pixel is larger than the low-chroma pixel; and adjusting the target V pixel to generate the output V pixel according to a monotonic increasing function when the target V pixel is smaller than or equal to the high-chroma pixel, but taking the target pixel as the output V pixel when the target V pixel is larger than the high-chroma pixel.

12. The image enhancement method according to claim 11, wherein the step of generating the noise suppressed V pixel includes:

among the adjacent pixels of the target V pixel, choosing the adjacent pixels arranged in the middle as a plurality of chosen V pixels;

averaging the chosen V pixels to generate a depolarized V pixel;

calculating an absolute difference between the target V pixel and the adjacent pixels previous to the target V pixel to generate a V pixel difference;

calculating an absolute difference between the adjacent pixels at the right side of the target Y pixel and the adjacent pixels at the left side of the target Y pixel to generate a Y pixel difference;

choosing the larger one between the V pixel difference and the Y pixel difference, and mapping the larger pixel difference to an intensity ratio; and blending the depolarized V pixel and the adjacent pixel that is N pixels previous to the target V pixel according to the intensity ratio to generate the noise suppressed V pixel.

13. The image enhancement method according to claim 12, wherein the step of choosing the adjacent pixels arranged in the middle as the chosen V pixels includes:

arranging the adjacent pixels at the vertical axis and the horizontal axis of the target V pixel, and choosing the adjacent pixels arranged in the middle as some of the chosen V pixels; and arranging the adjacent pixels at diagonals of the target V pixel, and choosing the adjacent pixels arranged in the middle as some of the chosen V pixels.

14. An image enhancement apparatus, comprising:

an image capturing device, sequentially obtaining pixels of an input image in a YUV color space, wherein each pixel includes a Y pixel, a U pixel and a V pixel; and an image processor, electrically connected to the image capturing device, wherein the image processor is configured to:

receive each pixel of the input image in the YUV color space;

execute a low-pass filtering process with respect to a target Y pixel and a plurality of adjacent pixels of the target Y pixel to generate a first low-pass pixel;

determine whether the target Y pixel is an edge pixel according to a total gradient variation, wherein when the target Y pixel is the edge pixel, the low-pass filtering process is executed according to an orientation of the edge pixel with respect to the target Y pixel and the adjacent pixels corresponding to the orientation to generate a second low-pass pixel;

determine whether the target Y pixel is a thin edge pixel, wherein when the target Y pixel is not the thin edge pixel, an edge response between the target Y pixel and the adjacent pixels is calculated according to a first mask, but when the target Y pixel is a thin edge pixel, the edge response between the target Y pixel and the adjacent pixels is calculated according to a second mask, and the edge response calculated according to the second mask is larger than the edge response calculated according to the first mask;

calculate an enhanced pixel corresponding to the total gradient variation and the edge response according to an enhancement function; and add the enhanced pixel to the second low-pass pixel to generate an output Y pixel.

15. The image enhancement apparatus according to claim 14, wherein when generating the first low-pass pixel, the image processor is further configured to:

determine a first weighting value of each adjacent pixel in previous rows and in subsequent rows of the target Y pixel according to similarities among the target Y pixel and the adjacent pixels in previous rows and in subsequent rows of the target Y pixel;

do a weighted average calculation with respect to the target Y pixel and the adjacent pixels in previous rows and in subsequent rows of the target Y pixel according to the first weighting values to generate an edge-protection low-pass pixel;

determine a second weighting value of each adjacent pixel at the right side and the left side of the target Y pixel according to the similarities among the target Y pixel and the adjacent pixels at the right side and the left side of the target Y pixel; and perform the weighted average calculation with respect to the edge-protection low-pass pixel and the adjacent pixels at the right side and the left side of the target Y pixel according to the second weighting values to generate the first low-pass pixel.

16. The image enhancement apparatus according to claim 14, wherein when generating the second low-pass pixel, the image processor is further configured to:

determine a third weighting value according to the similarities among the target Y pixel and the adjacent pixels corresponding to the orientation; and perform the weighted average calculation with respect to the target Y pixel and the adjacent pixels corresponding to the orientation according to the third weighting values to generate the second low-pass pixel.

17. The image enhancement apparatus according to claim 14, wherein when generating the second low-pass pixel, the image processor is further configured to:

determine whether the total gradient variation corresponding to the target Y pixel is larger than an edge threshold value;

determine that the target Y pixel is the edge pixel when the total gradient variation is larger than or equal to the edge threshold value, and determine the orientation of the edge pixel according to the total gradient variation corresponding to at least one edge orientation; and determine that the target Y pixel is not the edge pixel when the total gradient variation is smaller than the edge threshold value.

18. The image enhancement apparatus according to claim 14, wherein when determining whether the target Y pixel is the edge pixel, the image processor is further configured to:

calculate the edge response between the target Y pixel and the adjacent pixels according to the first mask when the target Y pixel is not the edge pixel.

19. The image enhancement apparatus according to claim 14, wherein when determining whether the target Y pixel is the thin edge pixel, the image processor is further configured to:

determine whether the target Y pixel is larger than or smaller than the adjacent pixels at diagonals of the target Y pixel;

determine that the target Y pixel is not the thin edge pixel when the target Y pixel is not larger than or not smaller than the adjacent pixels at the diagonals of the target Y pixel, and determine whether an absolute difference between the adjacent pixels at the vertical axis of the target Y pixel and the adjacent pixels at the horizontal axis of the target Y pixel is larger than a thin edge threshold value; and determine that the target Y pixel is not the thin edge pixel when the absolute difference is smaller than or equal to the thin edge threshold value, and determine that the target Y pixel is the thin edge pixel when the absolute difference is larger than the thin edge threshold value.

20. The image enhancement apparatus according to claim 14, when the image processor calculates the enhanced pixel according to the enhancement function, the larger the total gradient variation is, the larger the enhanced pixel will be; the smaller the total gradient variation is, the smaller the enhanced pixel will be; the larger the edge response is, the larger the enhanced pixel will be; and the smaller the edge response is, the smaller the enhanced pixel will be.

* * * * *